United States Patent

Waymeyer

[11] Patent Number: 5,660,355
[45] Date of Patent: Aug. 26, 1997

[54] ANGLE ONLY RANGE ESTIMATOR FOR HOMING MISSILE

[75] Inventor: Walter K. Waymeyer, Paradise, Calif.

[73] Assignee: Hughes Missile Systems Company, Los Angeles, Calif.

[21] Appl. No.: 652,885

[22] Filed: May 23, 1996

[51] Int. Cl.$^6$ ............................................ F42B 15/01
[52] U.S. Cl. ........................ 244/3.15; 244/3.16; 244/3.2
[58] Field of Search ............................. 244/3.15, 3.16, 244/3.19, 3.2

[56] References Cited

U.S. PATENT DOCUMENTS

| | | | |
|---|---|---|---|
| 4,038,527 | 7/1977 | Brodie et al. | 244/3.2 |
| 4,456,862 | 6/1984 | Yueh | 244/3.16 |
| 4,783,744 | 11/1988 | Yueh | 244/3.2 |
| 5,253,823 | 10/1993 | Lawrence | 244/3.15 |
| 5,429,322 | 7/1995 | Waymeyer | 244/3.15 |

Primary Examiner—Michael J. Carone
Assistant Examiner—Theresa M. Wesson
Attorney, Agent, or Firm—Charles D. Brown; Wanda K. Denson-Low

[57] ABSTRACT

Missile motion information from an inertial measurement set and the angle-to-target information from a seeker/sensor is used to estimate range and/or time to go on a homing missile without a direct measurement of range or range rate. Up to six comparisons of spectrally matched linear and angular measurements, corrected by target state estimates and analytical coupling terms, are used to determine the error in the range estimate. A nonlinear sorting and filtering procedure rejects the unusable error sources among the six potential error sources, and thresholds against too little information. The stability margin in the missile guidance loop is used as a sensor indicator for excessive estimated range.

9 Claims, 9 Drawing Sheets

APPROXIMATE LOOP FUNCTION $$\text{Kvst/s} * \left[ 1 + \frac{\text{Kve} * \text{Kdve} * s * (Xh - X)}{(s + \text{Kve}) * s * X} \right]$$

FIG.12.

ANGLE ONLY RANGE ESTIMATOR FOR HOMING MISSILE

TECHNICAL FIELD OF THE INVENTION

This invention relates to homing guided missiles having a range denied mode of operation, and more particularly to a range estimator for such missiles operating in the range denied mode.

BACKGROUND OF THE INVENTION

Homing guided missiles, particularly those launched against airborne targets, may have a range denied mode of operation. An example of a range denied mode is that of attacking an airplane with a very powerful jammer. While the self-protect jammer makes it easy to determine the angle from the missile to the target, it makes it impractical if not impossible to obtain and interpret a radar ranging return. Thus, the attacking aircraft has no information about the range to the target. Or, if tracking with an optical seeker, angle information may be obtained to substantial accuracy, but ranging with optical data is difficult, especially if the target optical size is unknown. In the range denied mode of operation, the missile may be required to function without range information in the "end game," resulting in reduced effectiveness of the missile. The effectiveness of a missile is not determined by whether it comes to the general vicinity of the target, but by how small a distance it misses the target. The last few seconds or even milliseconds of the engagement, when miss is really being discovered/determined, are termed the "end game."

Conventional missile guidance systems operating in the range denied mode have used proportional navigation in the end game, and suffered the near miss degradation due to the settling time following transients that occur near to zero range to the target. This has led to the rule of thumb that target acquisition must occur at about ten "time-constants to go," i.e. at ten time-constants prior to intercept. It is common to use first order feedback system terminology in a discussion of the end game. A time-constant is the time it takes, following a disturbance, to reduce the error induced to about ⅔ of its value. The state of the art has reduced the time-constant of a missile to the 100 millisecond or less domain. It has been discovered that acquisition occurrence can be reduced to two or three time-constants to go if range data is available to the guidance law. Thus there is a need for a range or time to go estimate.

Conventional angle only ranging schemes have required very large maneuvers to make the range observable. These large maneuvers were needed because the range estimators did not take advantage of the inherent geometrical dynamics associated with a homing missile's approach to the target. The conventional angle only ranging schemes have not made use of the six correlations available, and the sensitivity of the guidance loop stability margin to the range estimate in a range dependent guidance law, a feature in modern guidance laws that adds to the observability of range from angle only information. Moreover, such conventional schemes have not made use of correlation of noisy signals to classify in real time the usefulness of each of the six potentially available range error signals.

SUMMARY Of THE INVENTION

This invention uses missile motion information from an inertial measurement set, the angle-to-target information from a seeker/sensor and an initial estimate at range and range rate to estimate range and/or time to go on a homing missile without a direct measurement of range or range rate. Up to six comparisons of spectrally matched linear and angular measurements, corrected by target state estimates and analytical coupling terms, are used to determine the error in the range estimate. A nonlinear sorting and filtering procedure is used to reject the unusable error sources among the six potential error sources, and thresholds against too little information. A means for using the stability margin in the guidance loop as a sensor for excessive estimated range is also incorporated.

The invention permits the estimation of range to sufficient accuracy that the homing guidance system of the missile can achieve its desired effectiveness. While the estimation of range is typically not good enough to set the fuzing time delay, the estimation is adequate to reduce the miss distance. The quality of the range estimate will depend on the amount of uncertainty (noise) in the angle measurements, and the closing velocity. Fortuitously, the range observability from small motions of the missile improves rapidly as zero range is approached. Near zero range is precisely where the improved knowledge of range to target will be most useful in the reduction of miss or the achievement of a hit.

The invention has a reasonably good capacity to operate in a noisy angle measurement environment typical of radar guided missiles operating against low radar cross section targets. With the advent of optical seekers and much less angular error and noise, the practicality of an angle only range estimator has greatly improved. Moreover, the invention reduces the excursion level needed to make range estimations, and can make use of what were in the past regarded as troublesome terminal phase oscillations to make range observable.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

The angle only range estimator (AORE) in accordance with this invention embodies a method of dynamic triangulation that makes use of missile displacement and seeker/sensor measured angles to target as the missile/interceptor approaches intercept on a near collision course. Since range is not "observable" if there is no line of sight rate, it will always depend on the accidental or intentional line of sight motion by missile/interceptor action. If the missile moves from side to side at constant range, with a stationary target, an angle change and a distance change can be compared, and the solution is y/r=angle. If the target, at the same constant range moves also, the missile cannot tell if the angle change is due to its action or the target's action.

Figure 1:
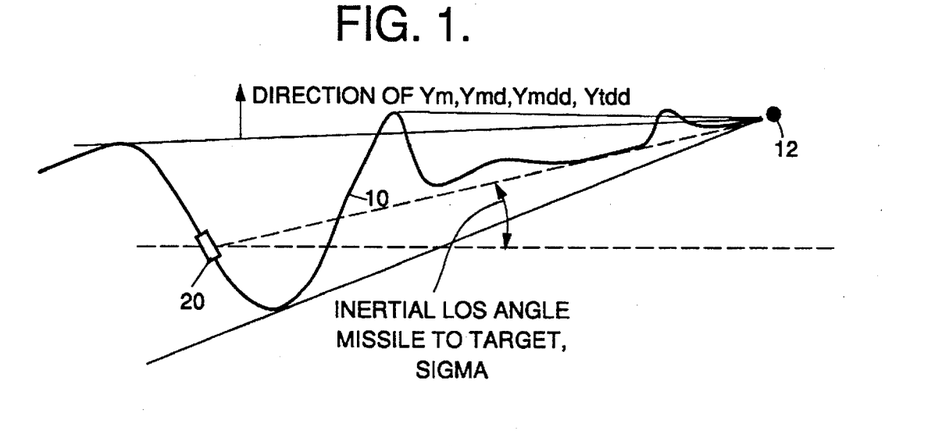
FIG. 1 illustrates a missile approaching intercept with a target.

FIG. 1 illustrates the path 10 of a missile 20 to a target 12. This missile is a guided missile, of the type described in U.S. Pat. 5,429,322, where the missile is seeking to match estimated target states. The lateral motion of the missile with respect to the target and the angular displacement sensed by the missile seeker, when appropriately correlated, define the range to the target. The correlation process, since both the target and the missile are in motion, can be called "dynamic triangulation."

In the range denied mode case, with target lateral motion, it is difficult to assess whether an angle change is due to lateral target displacement with respect to the missile, or a change in range. It is therefore imperative that either the target have no lateral motion (which is not within the missile's control), or that the missile lateral motion be substantially uncorrelated with the target lateral motion (which is somewhat under the missile's control). A tendency for the missile to intentionally spiral around the nominal intercept trajectory is one useful strategy. In many situations, the missile agility greatly exceeds the target agility. Under only the rarest of circumstances will the range estimated in accordance with the invention be as accurate as a bona fide measurement. But, when range is denied, the range estimate in accordance with the invention may be substantially better than no estimate at all. Fortuitously, the process in accordance with the invention is most accurate when the information is most needed.

Figure 2:
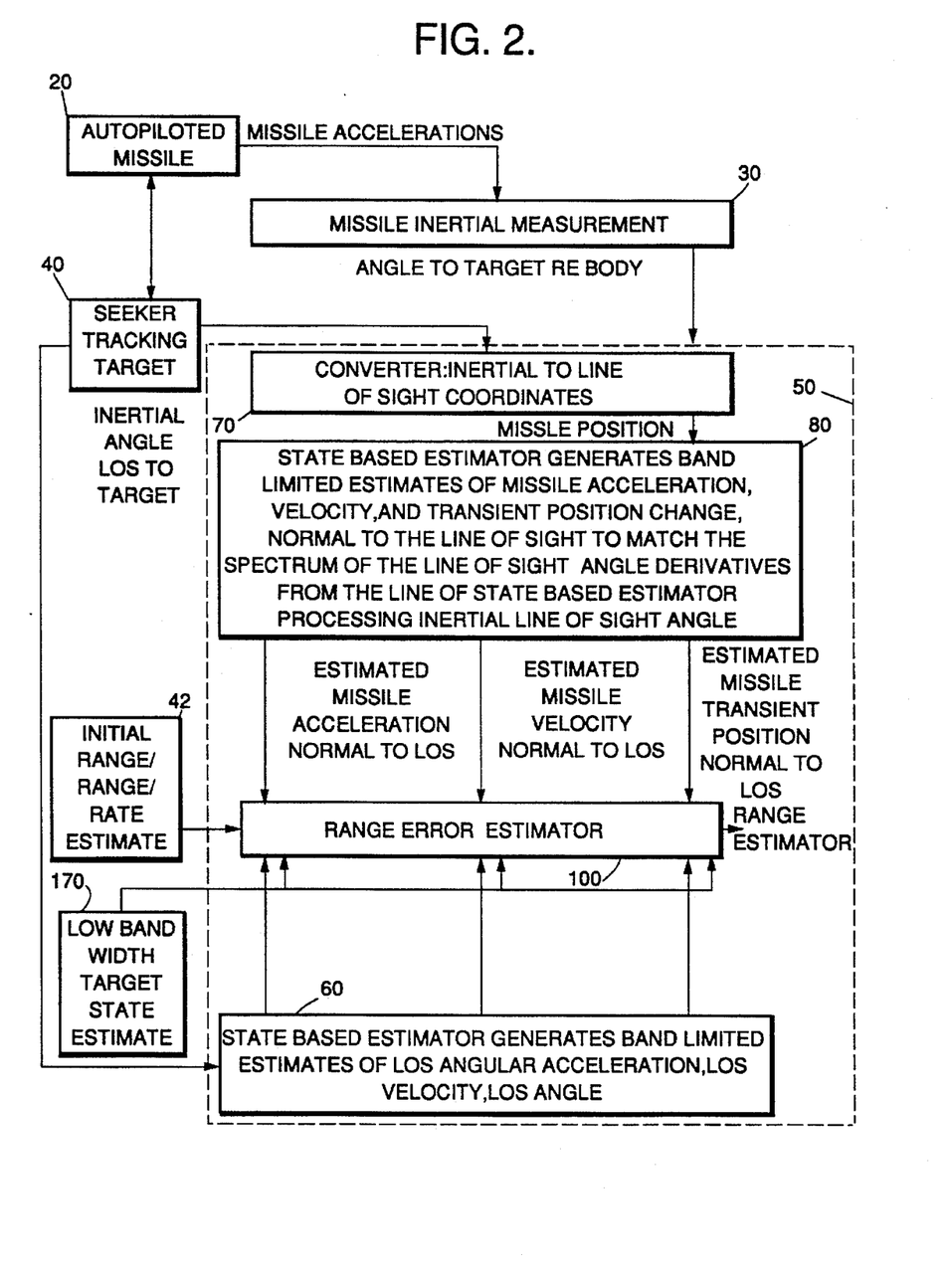
FIG. 2 is a functional block diagram of a missile with a range estimator in accordance with this invention.

FIG. 2 is a functional block diagram of the autopiloted missile 20 and the functions performed by the AORE 50. The missile is assumed to be homing on a target which may or may not be executing well timed evasive maneuvers. The missile has constant knowledge of its own location and movements by virtue of its inertial measurement unit 30, which measures the missile accelerations and, with the gimbal angle measurements at the seeker, provides a measurement of the angle to the target referenced to the missile body. The missile has constant knowledge of the inertial angle line of sight (LOS) from the missile seeker/sensor 40 to the target. An initial estimate (42) of the range and range rate is provided to the AORE 50, and can come from any source. Since the missile position and velocity are known, and there was enough information to decide to launch the missile against the target, it is unlikely that the initial range estimate and range rate estimate will be absurd. The objective in this system is to have the range (closely related to the "time to go") estimate converge to zero at the actual time of intercept, as the need for range in homing guidance is maximum in the last second or so of the engagement.

As indicated in FIG. 2, linear and angular measurements by the missile inertial measurement unit 30 and the missile's target tracking device, i.e. seeker 40, are used to create spectrally matched estimates of the missile's linear motion states normal to the line of sight and the angular motion states of the line of sight. Thus, the AORE 50 includes a state based estimator 60 responsive to the inertial angle LOS to target data from the seeker 40 to generate "band limited" estimates of LOS angular acceleration, LOS angular velocity and LOS angle. Since the inertial angle data provided by the seeker/sensor is imperfect and generally sampled periodically (as compared to being continuously available), it is not possible to fully differentiate (in the sense of the calculus) the information. But, in the low frequency band (a band from a quite low frequency up through the frequency at which the information is useful), useful derivatives can be extracted. Noise may be concentrated at higher frequencies. The useful frequency band of the estimates is the band as just described, and does not extend to higher frequencies. Hence, the derived information is "band limited." These band limited estimates are provided to the range error estimator 100.

A converter 70 converts the angle to target data provided by the inertial measurement unit (30), which is referenced to the missile body, to LOS coordinates of the missile position. The LOS position coordinate data is fed to a state based estimator 80, which generates band limited estimates of missile acceleration, velocity and transient position change, normal to the LOS, to match the spectrum of the LOS angle derivatives from the estimator 60 processing the inertial LOS angle data. These estimates are also provided to the range error estimator 100.

Figure 3:
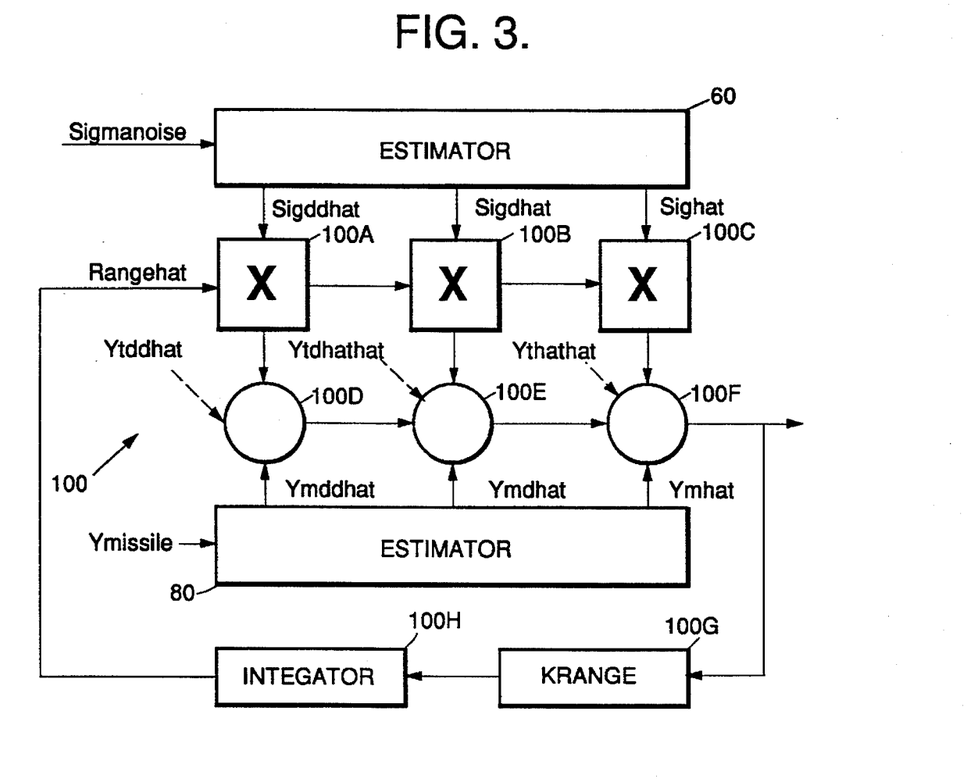
FIG. 3 is a functional block diagram of the angle only range estimator (AORE) of FIG. 2.

FIG. 3 is a functional block diagram of an exemplary embodiment of the range error estimator 100, implemented in two planes and with six range error sources. The two sources of information from the missile are the noise and body (typically radome) coupling contaminated measurement (sigmanoise) of the angle to the line of sight from seeker 40, and the position (Ymissile) of the missile as determined by the missile inertial measurement unit 30, and as converted by converter 60. These are the scalar components in this plane, say the up-down plane, with the missile position measured in a direction normal to the LOS direction. There will be comparable measurements in the other direction, say right-left.

One aspect of the invention is the estimation of the two derivatives of the measurements, and a filtered version of the measurements themselves. Thus, Ymhat represents the estimate of transient position change, Ymdhat the estimate of missile velocity, and Ymddhat the estimate of missile acceleration. These estimates are produced by the estimator 80. Similarly, sighat represents the estimate of LOS angle, sigdhat the estimate of LOS angular velocity, and sigddhat the estimate of LOS angular acceleration. These three estimates are provided by the estimator 60.

The range error estimator produces an estimate of the range error (rangetilda) to the target. The range error is also fed through a gain stage 100G and an integrator 100H to provide a signal (rangehat) which is applied to the respective multiplier stages 100A, 100B and 100C, for multiplication with the respective signals sigddhat, sigdhat and sighat.

It is an important aspect of the invention that the spectral characteristics of the variables in pairs be matched, and preferably that the spectral characteristics of all of these variables be matched. When variables are passed through linear filters of the type described here, the signal passing through the filter is changed in character as a function of frequency. That is, the signal component concentrated at any particular frequency is changed in amplitude and time of occurrence (i.e. phase). Matching the spectral characteristics implies, then, that the changed character of signals to be compared are identical, so that "apples and apples" and "pears to pears" comparisons are justified.

The exemplary implementation of FIG. 3 spectrally matches the variables in pairs. Sigddhat is spectrally matched to Ymddhat. Sigdhat is spectrally matched to Ymdhat. Sighat is spectrally matched to Ymhat. This is accomplished by summing the product from multiplier 100A with ymddhat at summing device 100D, summing the product from multiplier 100B with ymdhat, and summing the product from multiplier 100C with ymhat. Since the angle data and the rectangular data have both been passed through filters designed to match them spectrally, the resultant summed products represent "apples and apples" comparisons. The process of designing matching linear filters is well understood by those skilled in the data processing/filtering arts. In the estimators 60, 80 for these variables, the steady state (DC) value of sighat and Ymhat are slowly forgotten.

Figure 12:
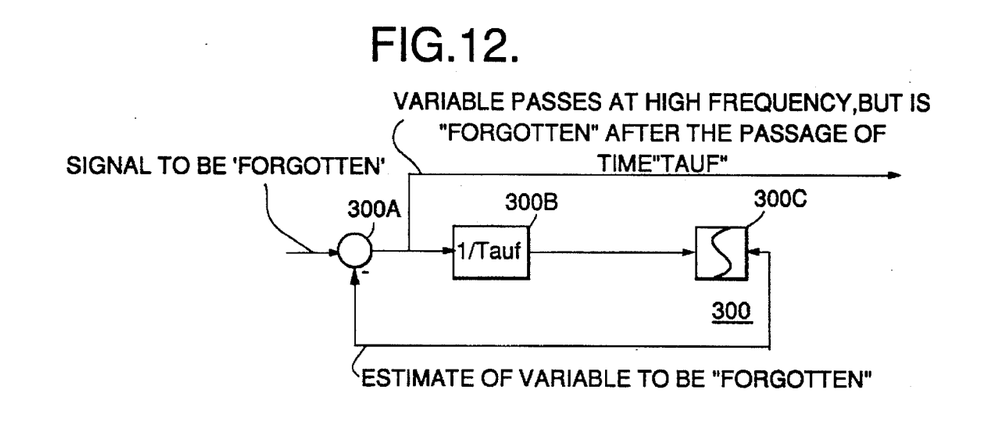
FIG. 12 illustrates a functional block diagram of a "forgetter" function, which slowly "forgets" a signal.

FIG. 12 illustrates a functional block diagram of a "forgetter" function 300, which slowly "forgets" a signal. The function includes a feedback loop, closed around the comparator 300A, the gain stage 300B and the integrator stage 300C. The signal to be forgotten is compared at comparator 300A with the estimate of the variable from the integrator 300C. The gain of stage 300B is the inverse time constant Tauf of the forgetter. The output of the function 300 is taken from the comparator 300A. The signal passes at high frequency but is "forgotten" after the passage of time tauf.

In the main, sigddhat times range (X) should almost equal Ymddhat, sigdhat times range should almost equal Ymdhat, and sighat times range should almost equal Ymhat. The amount by which they are not equal includes a potential measure of the error in the range estimate (rangehat) used in the multiplication. There are thus three errors in the sigma-products generated, each with a clue to the error in the estimated range being used. With the appropriate dynamic gain(s) on these errors, applied by gain stage 100G (FIG. 3), a rate of change of the estimated range is generated which will tend to drive the range estimate to the proper value, and tend to eliminate the error in the estimated range.

Figure 5:
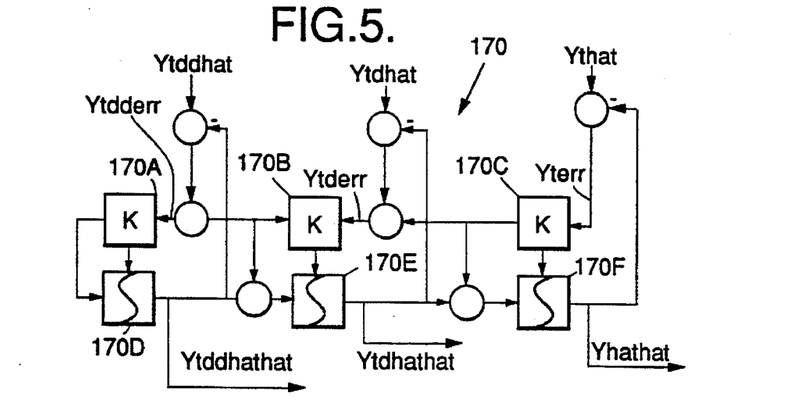
FIG. 5 is a functional block diagram of the target state estimator associated with the AORE.

Ythathat, Ytdhathat and Ytddhathat are low fidelity target state estimates produced by the target state estimator associated with the range estimator 100, as shown in FIG. 5.

Much of the difficulty in estimating range is associated with the noise from various sources added to the true line of sight angle in the overall measurement process.

Figure 4A:
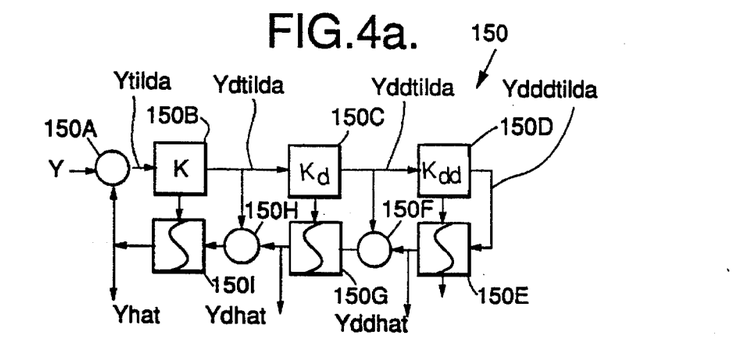
FIG. 4a and 4b show two exemplary filter/estimator configurations for generating spectrally matched angular and linear state estimates.
Figure 4B:
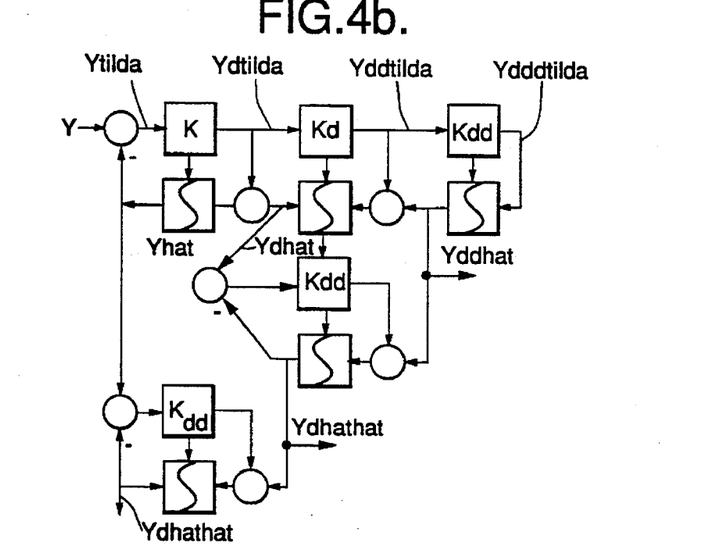

FIGS. 4a and 4b show two alternate estimator implementations for generating spectrally matched angular and linear state estimates. The implementation of FIG. 4a matches the spectra of the variables in pairs, while that of FIG. 4b tends to match the spectra in all the variables. The topology of the filters in FIG. 4a and FIG. 4b will be familiar to those skilled in the control and filtering arts, and is closely related to the topology of the well known continuous Kalman filter.

The measurement generically shown as signal Y enters the filter/estimator configuration 150 (FIG. 4a), and is compared at comparator node 150A to an estimate Yhat of the state measured. The estimate and its derivatives Ythathat, Ytdhathat and Ytddhathat are driven by gained error (Ydtilda, Yddtilda, Ydddtilda), with the expectation that, over time the estimated states will approach the (ever changing) plant states. The stages 150B, 150C and 150D represent gain stages for gain K, Kd and Kdd, respectively. Elements 150A and 150H represent differencer functions. The stages 150E, 150G and 150I represent integrator functions. FIG. 4A in general represents the topology of a Kalman filter.

FIGS. 4a and 4b represent alternate implementations of the estimators 60 and 80. The variables could be Ythat, Ymhat, or Sighat. The implementation of FIG. 4b produces three states with approximately the same bandwidth, Kdd. A workable rule of thumb is that K=2*Kd, and Kd=2*Kdd.

FIG. 5 is a functional block diagram of the target state estimator 170 associated with the AORE. The target state estimator 170 is not used in guiding the missile. There will typically be a high fidelity target state estimator on board the missile 20 for use in guidance. In the range estimator 100, a lower fidelity target state estimator is used. The estimator 170 is unconventional in that the three gains 170A, 170B and 170C are equal, and each state, primarily, is individually driven to remove an error, while the three states are yet connected by integrations (170D, 170E and 170F) to tend to maintain the appropriate dynamic relationship between the states. The angle seen by the missile seeker is affected by both missile and target motion. Hence the target activity, to the extent it can be used, is useful. But, if a broad band target state estimate is used, it will eliminate all errors due to range and assign them to target state, thus frustrating the entire process.

If the gains K (FIG. 5) are made too large, the observable range errors will be driven to zero, opening the loop (FIG. 3) on range estimation. On the other hand, if the gains K are made zero, there will be no recognition that the observed errors might be due to errors in the target state estimates.

It is assumed that the target model is a string of three integrators, and the only control available to the target is its rate of change of acceleration (jerk). The target's velocity and position follow from its acceleration. This assumption is well known in the estimator and Kalman filter art. Thus, in "estimator" style, the target is modeled as three serial integrators. If an error is seen in the estimate of the target position, the position state integrator is driven to attempt to null the error. If the error persists, it must be due to the wrong derivative estimate, and so the velocity integrator is driven to attempt to null the error. If the error continues to persist, it must be due to the acceleration error, and so the acceleration integrator is driven to null the error.

The high fidelity estimates of the target state (Ythat, Ytdhat, Ytddhat) are inputs to the integrators 170D, 170E, 170F of the estimator 170 of FIG. 5. It is assumed that the derivatives are connected by integrators 170D, 170E, 170F. The integrators are kept running to match the high fidelity inputs, on average and over time. Because the value for K is low, some time is required to respond to the high fidelity inputs. This is intentional because too much target following will assign all observed error to the target state and eliminate any error that could be used to estimate the range.

The main defenses against confusion due to target activities are spectral separation in the estimator (by the gain ratio technique just described), and orthogonalization of missile and target activity by design of the missile activity. By carefully choosing the gain K of the target state estimator 170 (FIG. 5), the helpful low frequency (below the perturbation frequency which the missile is inputting to allow range to be observable) action of the target will be observed, but the confusing high frequency range (in the frequency range of the missile action which is enabling range identification) target motion will not be seen, i.e. it will be filtered out. There will always be available to the target the possibility of executing a maneuver that will throw the range estimate into substantial error. The confidence in the AORE 50 will be based on the missile system's ability to orthogonalize the missile activity with respect to the target and/or to simply overpower the target activity.

Figure 6:
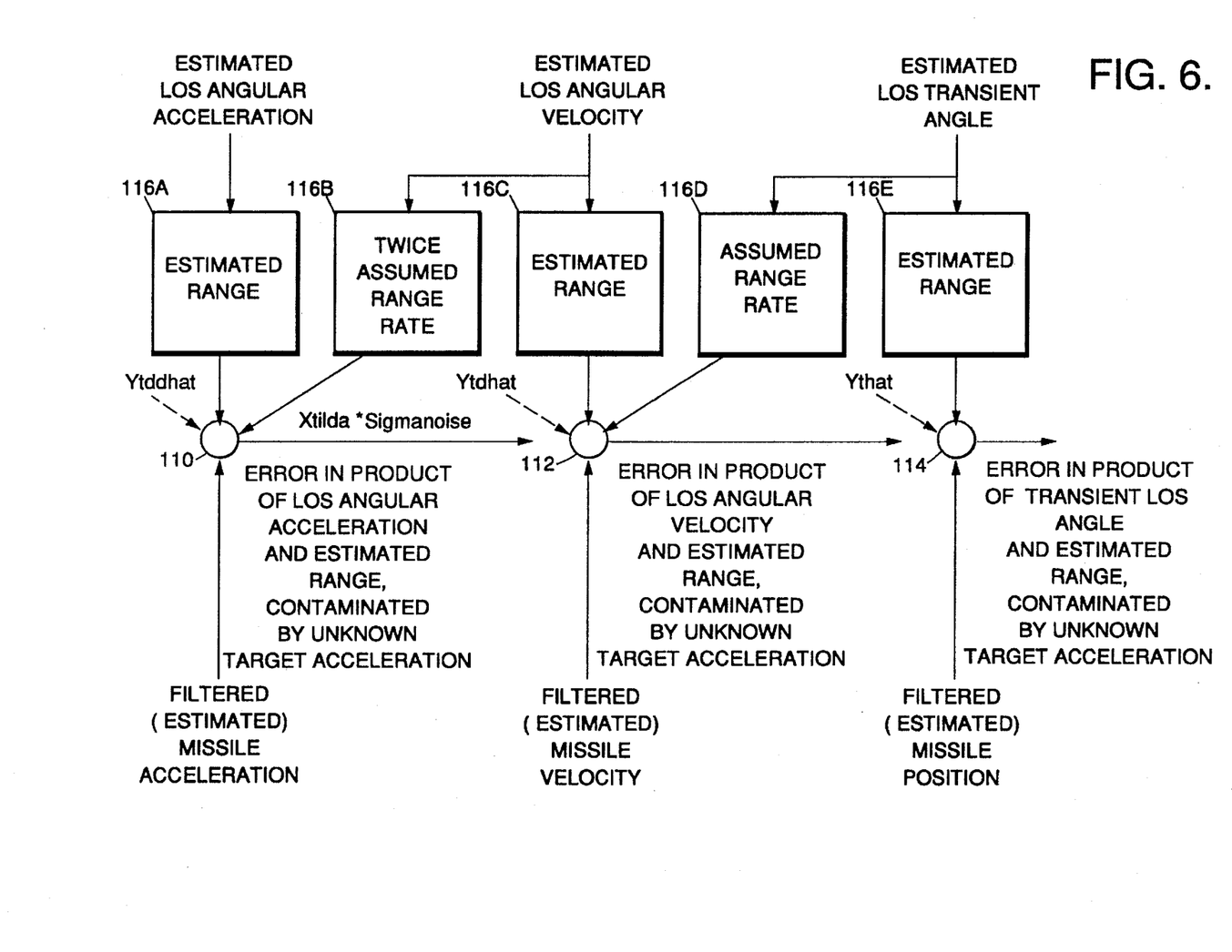
FIG. 6 illustrates functions performed by the AORE, particularly the generation of three indications of range estimate error per channel.

FIG. 6 illustrates functions performed by the range error estimator 100, particularly the generation of three indications of range estimate error per channel, i.e. in right-left and in up-down. The inputs are the spectrally matched states and derivatives from the estimators 60 and 80, per channel, i.e. three from "up-down" and three from "right-left". The three summing junctions 110, 112, 114 indicate three equations whose inputs would balance were the missile states, the target states and the seeker angle states all correct. The function boxes 116A–116E represent multipliers. Multiplier 116A multiplies the estimated LOS angular acceleration times the estimated range. Multiplier 116B multiplies the estimated LOS angular velocity by twice the assumed range rate to be added at junction 110 to the product from multiplier 116A. The dynamic equations of motion justify that the sum of these two signals should equal the missile acceleration (if there is no target acceleration, or if the target acceleration is not observed because it has been filtered out at high frequency). The low frequency helpful estimate of target acceleration Ytddhathat is also shown as added at summing junction 110. Multiplier 116C multiplies the estimated LOS angular velocity by the estimated range, which is summed at junction 112 with the product of the estimated LOS transient angle and the assumed range rate, and should equal the filtered missile velocity (normal to the LOS). The multiplier 116E multiplies the estimated LOS transient angle (with the low frequency "forgotten" as described above with respect to FIG. 12) by the estimated range, and the product is summed at junction 114 with the filtered estimated missile transient position (with the low frequency (DC) component "forgotten"), and the sum should reflect a range error.

The output of summing junction 110 is the error in the product of the LOS angular acceleration and the estimated range, which is contaminated by some unknown target acceleration. The output of summing junction 112 is the error in the product of the LOS angular velocity and the estimated range, which is contaminated by some unknown target velocity. The output of summing junction 114 is the error in the product of the transient LOS angle and the estimated range, contaminated by unknown target position.

The errors are used, primarily, to move the range estimate, and secondarily to move the target state estimates. It is noted that the quality of the target state estimates from the range estimator is not very good, and are carried only to aid the range estimator in identifying range.

Since the steady state (DC) values of missile position and line of sight carry no useful information for range estimation, they are slowly "forgotten", leaving then only the transient changes in these variables.

Figure 7:
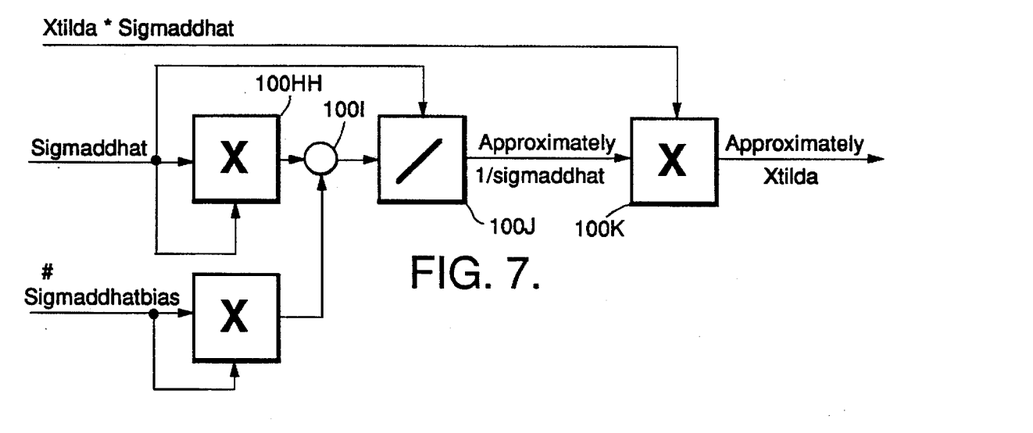
FIG. 7 illustrates an exemplary one of the six extractors comprising the AORE.

Having obtained the products (i) estimated range error times the LOS angular acceleration, (ii) estimated range error times the LOS angular velocity, and (iii) estimated range error times the LOS transient velocity, the task is to extract each of the estimated range errors by dividing by the appropriate LOS state. FIG. 7 illustrates, as an example of the six extractors comprising the range error estimator 100, the means for the extraction of a range error from the product error, Xtilda times Sigmaddhat, which is the error in the product of the LOS angular acceleration and the estimated range, contaminated by unknown target acceleration.

Sigmaddhat is squared at function 100HH, and a squared bias is added at function 100I. Then Sigmaddhat is divided by the sum at function 100J. This produces, approximately, the inverse of Sigmaddhat, which when multiplied times the product error at function 100K, produces one approximation to the range estimate error Xtilda. This error can sometimes be identified as not useful, when the other inputs to the product errors do not have the same sign as Sigmaddhat times Xhat, Sigmadhat times Xhat, and Sigmahat times Xhat, respectively. Sigmaddhatbias is introduced to prevent a division by zero, and to assist in suppressing noise.

Figure 8:
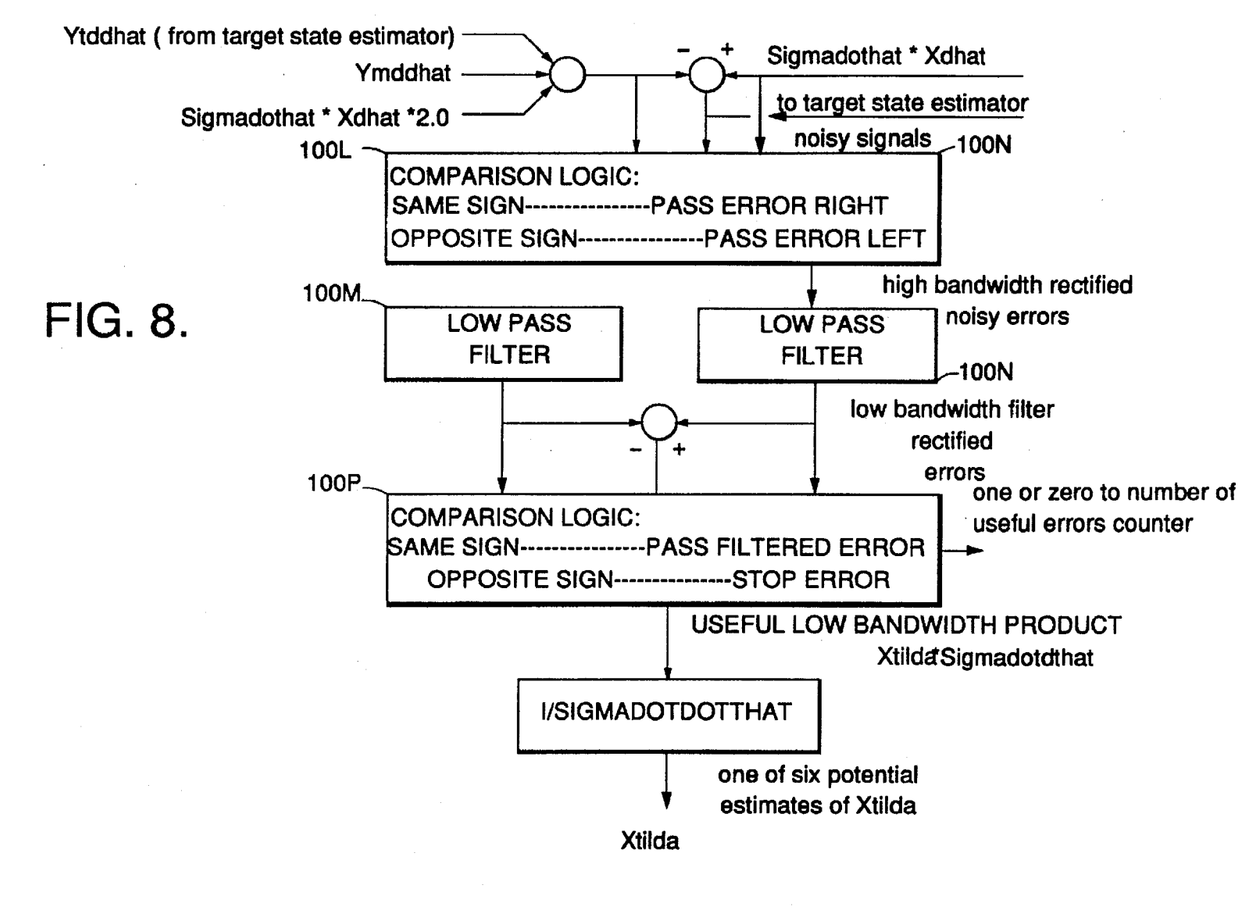
FIG. 8 illustrates the rejection of range error estimates under appropriate circumstances.

FIG. 8 illustrates the rejection of range error estimates. In addition to the more or less automatic rejection of error products produced by very small LOS angle states, there is a requirement to reject the error states when the two components of the error product are not, on average, of the same sign. The nonlinear mechanism of the rejection is an important aspect of the invention. Conventional systems have the tendency to transition from a normal convergent behavior to a bizarre divergent behavior. Yet the averaging effect in the range error generation is vital to acceptable operation in the presence of the ubiquitous noise.

The signs of the two incoming, spectrally matched signals ymddhat and sigmaddhat are compared by logic 100L on an instantaneous basis to sort errors generated when the two inputs have the same sign from those generated when the two inputs have a different sign. Having done this, the averaging feature is restored by filtering each of these signals by respective low pass filters 100M, 100N. Then the signs of the averaged signals are compared at logic 100P. Only if these signs are the same is the error product useful.

Therefore, it is possible at any one time to have 1, 2, 3, 4, 5, or 6 error signals that have some validity. Since each error is gained individually, before summing as a range rate correction, when there are fewer error signals the loop gain goes down. The number of valid errors required for confidence can be thresholded. In an exemplary implementation, the range estimator 100 is put into "coast" at the assumed range rate when less than two valid error products are available.

Figure 9:
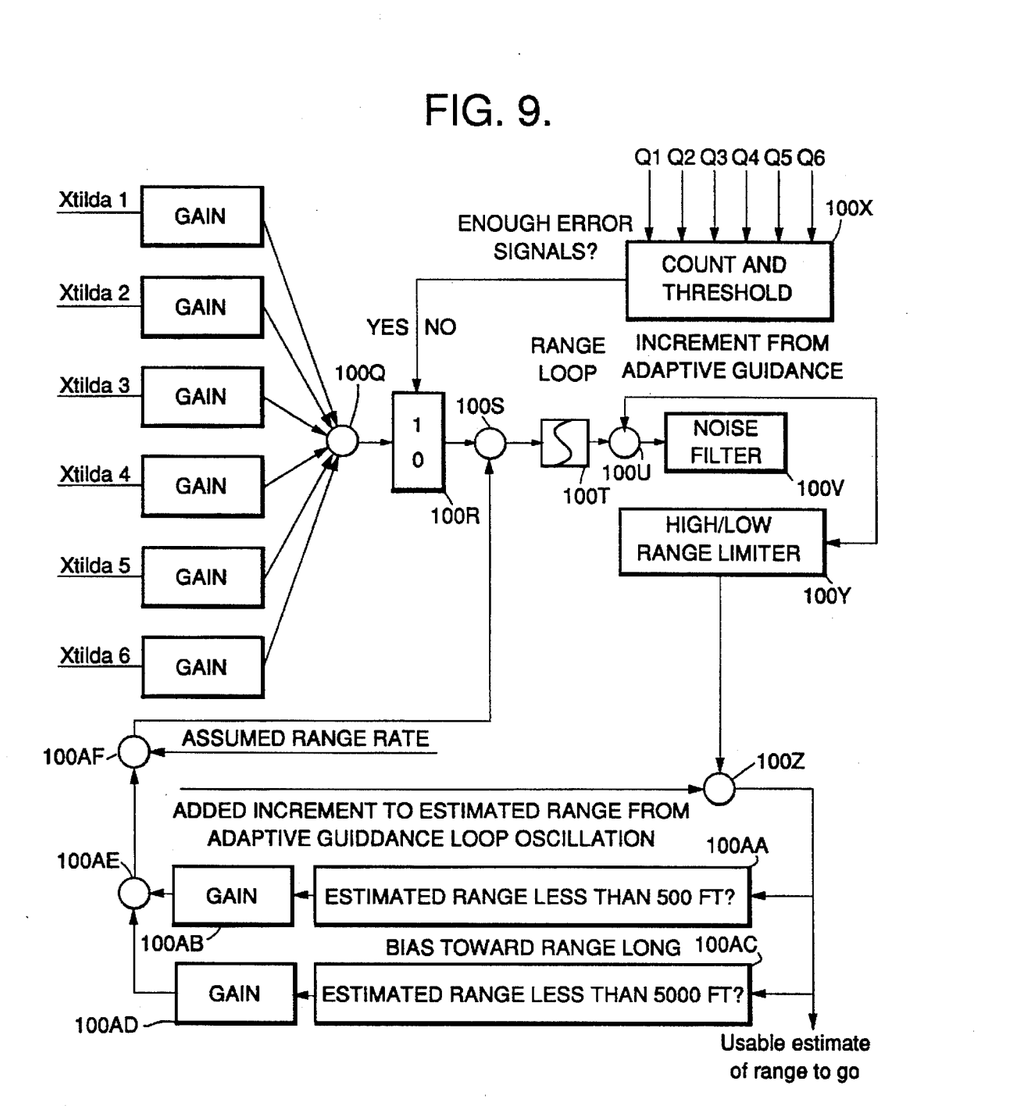
FIG. 9 illustrates the combining of available signals cluing the error in range.

FIG. 9 illustrates the combining at function 100Q of available signals Xtilda1 through Xtilda6 cluing the error in range. The range errors at this point have already been considered for validity. If the signals were invalid, they will appear here at the zero amplitude level, and gaining them will have no consequence. Another input at function 100R is the Quality signal for each error, a "one" or a "zero." If the number of errors that are considered valid does not exceed the threshold (for example, one signal), then the system will allow range to drift or coast with the assumed range rate until the threshold is exceeded, by summing at function 100S the resultant value from function 100R (zero, for the case when the number of valid errors does not exceed the threshold) with a value dependent on the assumed range rate.

The resultant sum from function 100S may contain substantial noise and need to be further filtered after integration 100T by noise filter 100V to suppress that noise. The guidance system has no need for excessively long range estimates, and tends to open up for short range estimates. Therefor the range of usable estimates is limited. The net result on range-utilizing-guidance of an excessive range estimate is a tendency toward oscillation and instability, which incidentally makes range observable, with nevertheless, a strong loop closure toward the reduction of miss. On the other hand a range estimate that is too small, tends to open the guidance loop, with potentially catastrophic results, i.e. the result of essentially no guidance at all. Therefore the system design contains a tendency to move range up when it is being driven below set thresholds. There is mechanized, in effect, a nonlinear spring that keeps the range estimate from resting easily at low values.

Referring to FIG. 9, the six error signals Xtilda1-Xtilda6 are generated in two channels at the angle, angular rate and angular acceleration levels. Q1–Q6 represent quality variables coming in to be counted. The summed errors from 100Q are passed or not by function 100R, depending on the verdict of the quality counter 100X. If there are enough error signals, the composite error is useful in identifying range and is used; otherwise, if there are not enough error signals the composite error is not used. At the summing junction 100S, the assumed range rate is modified by the gained error, so that the rate of integration (100T) will move the range estimate in the correct direction. Next, at summing junction 100U, the range increment from the adaptive guidance is added, if any. In general, all of the signal at this point is noisy. To prevent unusually large excursions in the range estimate due to this noise (superposed on the signal) there is a noise filter (100V). Since the process is a sensitive probabalistically-correct but often instantaneously-wrong process, and the reasonable values of range are known (for example, range is never negative), for protection the range estimate is limited by limiter 100Y. The guidance system can tolerate with some degradation a range estimate that is too long, but will not tolerate range estimates that are too short or negative. An output from the high/low range limiter 100Y is the "usable estimate of range to go."

As shown in FIG. 9, for further margin, additional feedbacks are added to slow the decay of estimated range when it approaches the low range to the negative danger zone. These are provided in the form of conditional gain stages 100AB and 100AD which come into effect, respectively, when the estimated range is less than 500 feet and less than 5000 feet, for example. If the overall work of the estimator is to seek low range values, considered dangerous to the guidance system performance (again performance degrades when range is too long, but collapses when range is too short), these two feedbacks tend to retard the range estimates approach to zero range.

The "range increment from adaptive guidance" or equivalently the "added increment to estimated range from adaptive guidance loop oscillation" can be added, at junction 100U or 100Z, respectively, depending on the requirements of a particular application.

Figure 10:
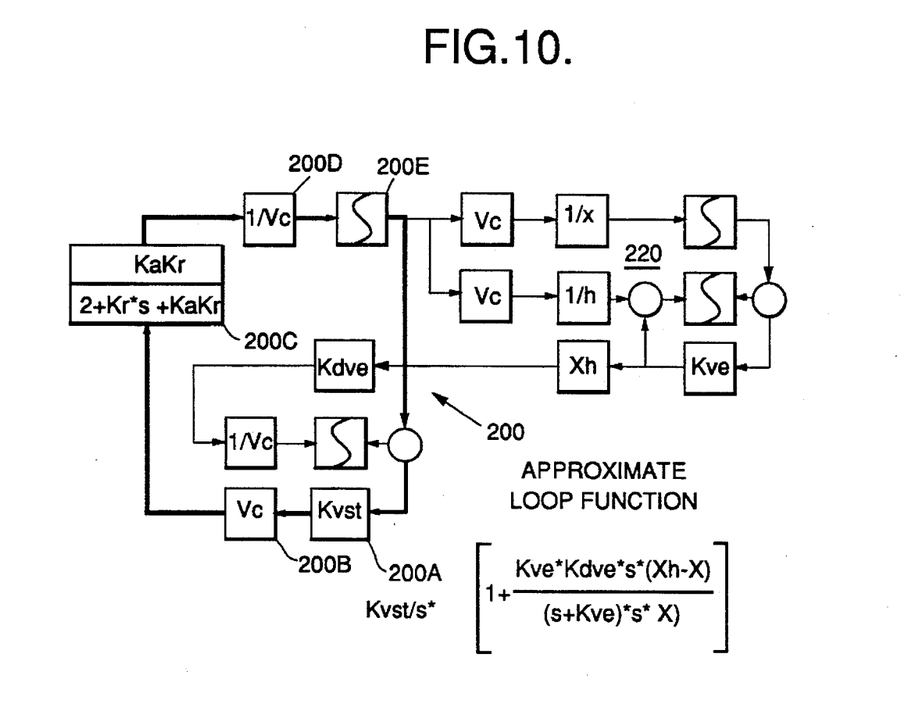
FIG. 10 is a schematic block diagram illustrating the dependence of the guidance loop stability on the range estimation error.

The stability level of the guidance loop may provide a range adjustment signal to combine with the output of the integrator. This is shown in FIG. 10, which illustrates the approximate dependence of the loop guidance stability function on the range estimation error. FIG. 10 illustrates an embodiment of a missile homing guidance loop 200. There are a number of alternate methods for mechanizing the loop. An aspect of the invention is a guidance loop which operates at a level that maintains a minimum stability margin by choice of the gain Kvst, and utilizes a target state estimator that depends, in its operation, on a range estimate. The parameters illustrated in FIG. 10 include:

Vc=Closing velocity
Ka=Acceleration control loop gain
Kr=Body rate control loop gain
s=LaPlace operator
x=Range
xh=(xhat) Estimated range
Kve=Angle estimator gain
Kdve=Angular rate estimator gain The elements 200A through 200E comprise the guidance loop for the missile. The other elements shown in FIG. 10 will not affect the operation of the guidance loop if the range estimate is correct, but perturb the loop 200 when the range estimate is incorrect. The loop gain is too high, and the system is oscillatory or unstable when the range estimate is too long. The presence of an oscillation in the loop with long range error produces a quantitative measure of the excess in the range estimate if it can be separated from associated noisy indications.

FIG. 10 indicates that the secondary loop shown as 220 will have zero gain if the range (x) and estimated range (xh) are identical. However, if they are not equal the loop will tend toward instability for range estimates that are too high and will tend toward an open loop if the range estimate is too low. Hence the level of stability in the guidance loop is an indicator, or potential sensor, of the excessiveness of the range estimate.

Figure 11:
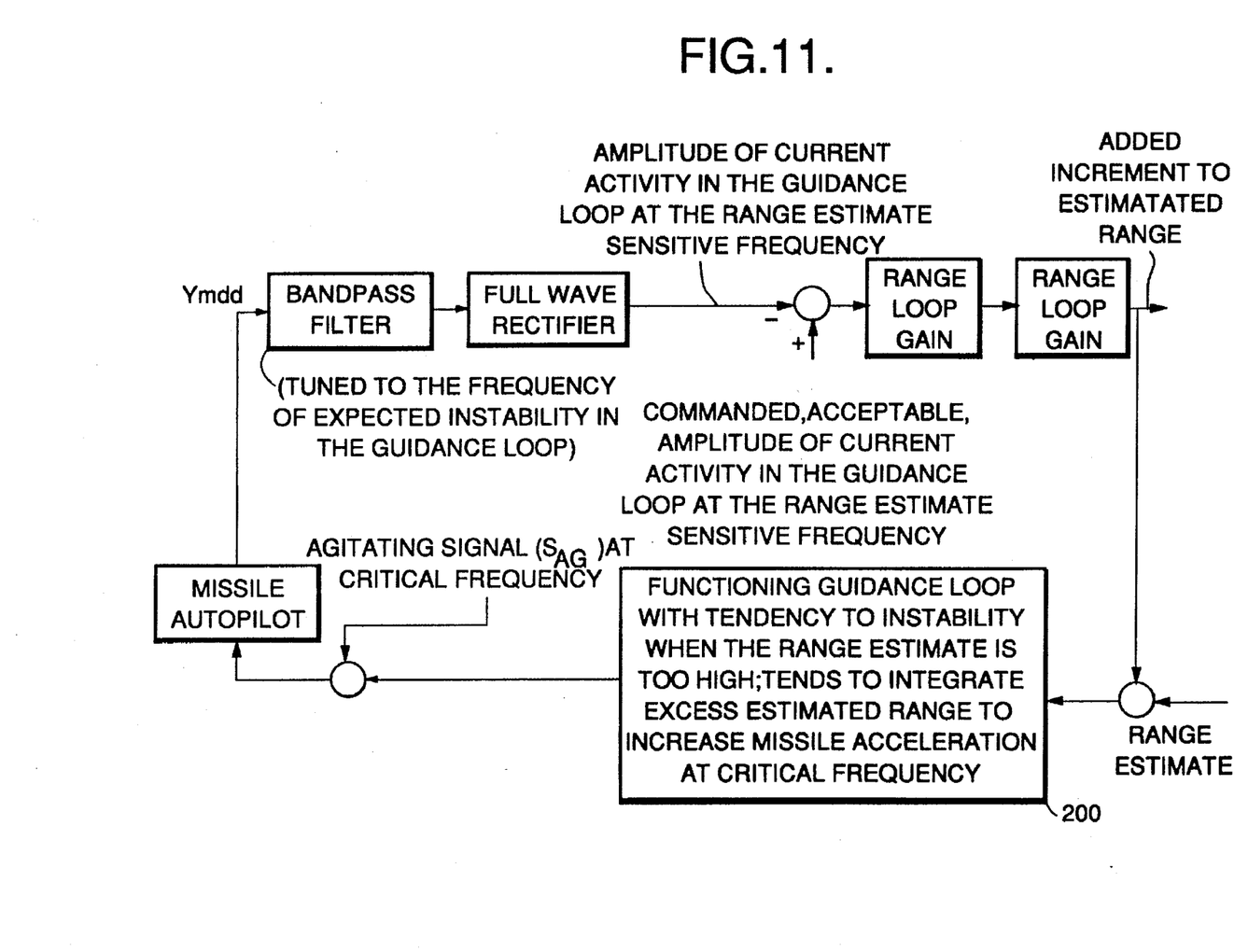
FIG. 11 is a schematic block diagram illustrating the observability of the range error through the degree of stability in the guidance loop.

FIG. 11 shows how the range error is observable through the degree of stability in the guidance loop. In the exemplary guidance loop, which uses a range estimate for best performance, a range estimate which is too high will cause a divergent instability. The divergence will tend to grow at a rate that is proportional to the excess in the range estimate. Other than the small amount of energy lost in sustaining the oscillation, at a relatively high frequency, there is little penalty for a limited amplitude oscillation in the guidance loop. Hence the approach is to permit, actually encourage, an oscillation in the guidance loop. When this oscillation grows beyond the set point amplitude, the noted excess oscillation amplitude is used to drive the range estimate down. At low bandwidth, this creates a simple first order integral loop, which is effective, at sufficiently low noise to signal ratios, in lowering range to the approximately correct value. Hence, this provides a seventh range error source to add to the basic six error sources previously described.

An unstable loop will not always dependably start or sustain its own oscillation. That is why a signal ($S_{AG}$) to "urge" it to continually oscillate, at the frequency of the incipient instability, is provided.

It is understood that the above-described embodiments are merely illustrative of the possible specific embodiments which may represent application of principles of the present invention. Other arrangements may readily be devised in accordance with these principles by those skilled in the art without departing from the scope and spirit of the invention.

What is claimed is:

1. An angle only range estimator for a homing missile, the missile including a missile inertial measurement unit responsive to missile accelerations to provide inertial missile position coordinate data, a seeker tracking unit for tracking a target and providing a seeker angle data value indicative of the angle between the missile centerline and the line of sight (LOS), the range estimator comprising:

a convertor responsive to the inertial missile coordinate data to convert the inertial missile coordinate data to missile LOS position coordinate data indicative of the missile position;

a first estimator responsive to the missile LOS position coordinate data to generate missile estimates of missile acceleration, velocity and transient position change normal to the missile LOS;

a second estimator responsive to the seeker generated angle LOS to target data to generate estimates of missile LOS angular acceleration, LOS angular velocity and LOS angle; and a range error estimator responsive to the estimates of missile acceleration, velocity and transient position change normal to the missile LOS generated by the first estimator and to the estimates of missile LOS angular acceleration, LOS angular velocity and LOS angle generated by the second estimator to generate one or more estimates of missile range to target.

2. The range estimator of claim 1 wherein corresponding ones of the missile estimates and the LOS estimates are spectrally matched.

3. The range estimator of claim 2 wherein all of the missile estimates and all of the LOS estimates are spectrally matched to each other.

4. The range estimator of claim 1 further comprising a target state estimator for providing low fidelity estimates of target state data, and wherein said range error estimator is further responsive to said low fidelity estimates to generate said estimate of missile range to target.

5. The range estimator of claim 1 wherein said range error estimator comprises means for generating up to six estimates of missile range to target based on data provide by said first and second estimators in two planes.

6. The range estimator of claim 5 further comprising logical means for determining when corresponding ones of said estimates of said missile acceleration, velocity and transient position change and said estimates of missile LOS angular acceleration will not produce one or more valid estimates of missile range, and means for preventing updating of a corresponding estimate of missile range with invalid estimate data.

7. The range estimator of claim 6 further comprising means for averaging said plurality of estimates of range error to produce an average range error estimate, and means for preventing updating of said average range error estimate by fresh estimate data unless at least a threshold number of said range estimates is valid.

8. The range estimator of claim 1 wherein the missile further includes a range aided guidance loop, said loop having a tendency for instability, and said range estimator further comprising means for using instability tendencies in said range aided guidance loop to obtain information to correct a current range estimate.

9. The range estimator of claim 8 wherein said means for using instability tendencies measures a changing amplitude of oscillation of said loop, and wherein said range estimator further comprises means for providing a driving signal to agitate the guidance loop toward oscillation to improve the observability of changing amplitude of oscillation.

* * * * *